No. 668,136. Patented Feb. 12, 1901.
F. P. BOND & S. A. SKELTON.
SHIELD FOR CORN CULTIVATORS.
(Application filed Sept. 28, 1897.)
(No Model.)
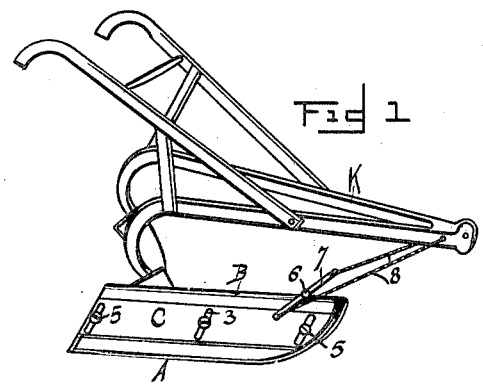
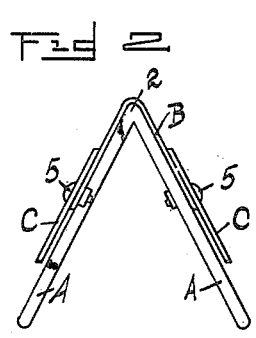
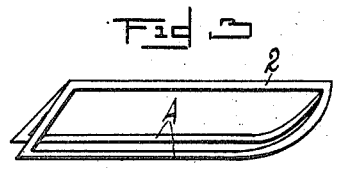
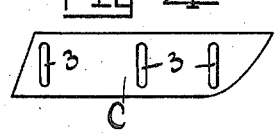
Witnesses
A. M. Elkjer.
H. W. Pennock.
Frank P. Bond
Silas A. Skelton
Inventors
By Their Attorney

UNITED STATES PATENT OFFICE.

FRANK P. BOND AND SILAS A. SKELTON, OF MISSOURI VALLEY, IOWA.

SHIELD FOR CORN-CULTIVATORS.

SPECIFICATION forming part of Letters Patent No. 668,136, dated February 12, 1901.

Application filed September 28, 1897. Serial No. 653,364. (No model.)

*To all whom it may concern:*

Be it known that we, FRANK P. BOND and SILAS A. SKELTON, residing at Missouri Valley, in the county of Harrison and State of Iowa, have invented certain useful Improvements in Shields for Corn-Cultivators; and we do hereby declare that the following is a full, clear, and exact description of the invention, such as will enable others skilled in the art to which it appertains to make and use the same, reference being had to the accompanying drawings, which form a part of this specification.

This invention has relation to an improvement in adjustable fenders or shields for plants, said shields being adapted to be used singly or in pairs in conjunction with any suitable cultivator or tilling device.

In the accompanying drawings we have shown in Figure 1 a perspective view of one of our fenders or shields as connected to an ordinary cultivator. Fig. 2 shows an end view thereof, disclosing the arrangement of the adjustable fenders. Fig. 3 shows a perspective of this skeleton frame as used in our device, while Fig. 4 shows a detail of one of the adjustable fenders.

Our invention comprises, essentially, an iron skeleton frame of any suitable size and material and which embodies, essentially, the runners A A, which are united above to a common ridge-bar 2. To this runner is first secured an ordinary deck or hood section B, of sheet metal or any other suitable material, which is secured to the skeleton framework by any suitable means. This framework is so constructed that the runners A A are united to the upper ridge-bar 2 to form an arch, and, if desired, they may be curved. To this section B are secured a number of bolts 5, by means of which bolts two fenders C C are adjustably secured to the deck portion B. Secured to the ridge-bar 2 upon the outside is a suitable pivoted bar 7, which bar is secured by means of a bolt 6 and is provided with the strands 8, which are secured to the cultivator K in any suitable manner.

In cultivating the ground is sometimes mellow; but when hard the cultivator breaks the ground into clods or larger openings than when the ground is mellow. To provide a fender by means of which the earth may be properly admitted to the plants in conformity to the conditions of the ground is the aim and object of this invention. Now, for instance, where the ground is fine and mellow and breaks fine the fenders C are placed quite low and the broken earth feeds through the openings formed between the runners A and fenders C. Then when the ground is hard and coarse the fenders are raised a corresponding distance, so as to allow the somewhat-larger clods to feed through the increased opening formed between the fender and runners. In this way we provide a fender or shield which can be instantly adjusted to meet any required condition.

The device is not a complicated machine nor easy to get out of order and can be adjusted with an ordinary monkey-wrench, or, if desired, the fastening device could be in the form of thumb-screws.

The device is noticeable because of its extreme simplicity.

Having thus described our said invention, what we claim as new, and desire to secure by United States Letters Patent, is—

In a shield for corn-cultivators of the character described, an iron skeleton frame embodying the runners A, united to the common ridge-bar 2, the sheet-metal hood B, secured to said ridge-bar and runners, the bolts 5 secured to the hood B, and the fenders C, one secured to the hood upon each side, said fenders being adjustably secured to said hood.

In testimony whereof we affix our signatures in presence of two witnesses.

FRANK P. BOND.
    SILAS A. SKELTON.

Witnesses:
 A. D. HOSBROOK,
 E. F. JAMES.